(12) United States Patent
Huang et al.

(10) Patent No.: US 10,304,638 B2
(45) Date of Patent: May 28, 2019

(54) MEDIUM VOLTAGE DOUBLE POWER SUPPLY CHANGE-OVER SWITCH WITH PERMANENT MAGNET

(71) Applicant: Shenzhen Taiyong Electric Co., Ltd., Shenzhen (CN)

(72) Inventors: Zhengqian Huang, Shenzhen (CN); Tiefeng Su, Shenzhen (CN)

(73) Assignee: SHENZHEN TAIYONG ELECTRIC CO., LTD., Shenzhen (CN)

( * ) Notice: Subject to any disclaimer, the term of this patent is extended or adjusted under 35 U.S.C. 154(b) by 136 days.

(21) Appl. No.: 15/700,192

(22) Filed: Sep. 11, 2017

(65) Prior Publication Data
US 2018/0151309 A1     May 31, 2018

(30) Foreign Application Priority Data
Nov. 25, 2016 (CN) .......................... 2016 1 1050811

(51) Int. Cl.
| | |
|---|---|
| *H01H 9/20* | (2006.01) |
| *H01H 3/28* | (2006.01) |
| *H01H 3/22* | (2006.01) |
| *H01H 3/46* | (2006.01) |
| *H01H 3/50* | (2006.01) |
| *H01H 9/26* | (2006.01) |

(Continued)

(52) U.S. Cl.
CPC .............. *H01H 3/28* (2013.01); *H01H 3/227* (2013.01); *H01H 3/46* (2013.01); *H01H 3/50* (2013.01); *H01H 9/26* (2013.01); *H01H 71/10* (2013.01); *H02J 9/061* (2013.01)

(58) Field of Classification Search
CPC ............ H01H 71/10; H01H 3/22; H01H 3/28; H01H 3/46; H01H 3/50; H01H 9/26; H02J 9/06
USPC ......................................................... 335/168
See application file for complete search history.

(56) References Cited

U.S. PATENT DOCUMENTS 1,557,088 A * 10/1925 Read ...................... H01H 50/32
                                                           200/5 R
1,729,538 A * 9/1929 Coates ..................... H02B 1/00
                                                         200/18

(Continued)

*Primary Examiner* — Shawki S Ismail
*Assistant Examiner* — Lisa N Homza
(74) *Attorney, Agent, or Firm* — Gokalp Bayramoglu

(57) ABSTRACT

The invention relates to a medium voltage double power supply change-over switch using a permanent magnet mechanism. The invention is provided with a spring as the breaking force and closing buffer, a chassis and a plum blossom contact structure, a manual emergency breaking and manual closing function. Further, the invention is provided with an in-out auxiliary mechanism of a movable contact, a chassis closing and locking mechanism, and a hydraulic buffer mechanism. Advantages of the present invention include simple structure, stable performance, and long mechanical life. The pull-out structure is used, greatly improving the convenience of installation and maintenance. The capacitor is used as a permanent magnet drive power supply, completing the switching between the two medium voltage power supplies. The invention realizes comprehensive operation functions of the change-over switch, such as automatic operation switching, electrical operation switching, and manual switching.

11 Claims, 8 Drawing Sheets

(51) Int. Cl.
*H01H 71/10* (2006.01)
*H02J 9/06* (2006.01)

(56) References Cited

U.S. PATENT DOCUMENTS

| | | | | | |
|---|---|---|---|---|---|
| 2,382,127 | A | * | 8/1945 | Brain ..................... | H04L 15/16 178/85 |
| 2,392,183 | A | * | 1/1946 | Phillimore .............. | G04F 3/027 335/60 |
| 2,414,472 | A | * | 1/1947 | Lockridge ................ | B61L 3/08 104/88.02 |
| 2,526,804 | A | * | 10/1950 | Carpenter .......... | H01H 51/2281 200/248 |
| 2,677,017 | A | * | 4/1954 | Sengebusch ........... | H01H 67/12 200/177 |
| 2,766,334 | A | * | 10/1956 | Greeson ................ | H01H 50/66 200/5 D |

* cited by examiner

_US 10,304,638 B2_

MEDIUM VOLTAGE DOUBLE POWER SUPPLY CHANGE-OVER SWITCH WITH PERMANENT MAGNET

CROSS REFERENCE TO RELATED APPLICATIONS

This application is based upon and claims priority to Chinese Patent Application No. 201611050811.8, filed on Nov. 25, 2016, the entire contents of which are incorporated herein by reference.

TECHNICAL FIELD

The present invention relates to the field of electromechanical technology, and more particularly to a medium voltage double power supply change-over switch with a permanent magnet.

BACKGROUND

In the electromechanical industry, the so-called medium voltage double power supply change-over switch in the current market is composed of two medium voltage circuit breakers. The volume is huge. Moreover, the so-called medium voltage double power supply change-over switch only has the electrical interlocking function. In addition, the interlocking reliability is low, which cannot meet the demand of the modern market. Thus, developing a medium voltage double power supply change-over switch with an integrated structure, small size, and reliable mechanical and electrical interlocking has become an inevitable trend.

SUMMARY OF THE INVENTION

In order to overcome the above deficiencies, the objective of the present invention is to provide a medium voltage double power supply change-over switch with a permanent magnet, which has a small size and reliable electromechanical interlocking.

A medium voltage double power supply change-over switch with a permanent magnet mainly comprises an A power supply component, a B power supply component, a body frame, a charging capacitor, a chassis, a chassis closing and locking mechanism, a valve actuator, a mounting substrate, a manual emergency breaking mechanism, an in-out auxiliary mechanism of a movable contact, a pulling rod, a rocker arm, a handle, a crank handle, a chassis screw rod square shaft, a chassis unlocking plate equipped with chassis, a locking crank arm, a rotating shaft of manual emergency breaking mechanism, a square hole, a rotating shaft of auxiliary mechanism, a rocker arm, a breaking hydraulic buffer mechanism, a load terminal contact arm, a manual emergency closing mechanism, a left power supply cabinet auxiliary device, a left power supply cabinet auxiliary device.

The A power supply component includes an A power supply crank arm mechanism, an A power supply permanent magnet driving mechanism, an A power supply mechanical interlocking mechanism, an A power supply connecting rod, a signboard of closing and breaking status of the A power supply, an auxiliary contact device of A power supply solid sealed pole, an A power supply driving connecting rod, an A power supply solid sealed pole, an A power supply closing and locking press arm, an A power supply axial limiting mechanism, an A power supply manual emergency breaking pull rod, an A power supply terminal contact arm, an A power supply breaking spring, an A power supply closing hydraulic buffer mechanism, an A power supply manual closing reset spring, an A power supply crank arm mounting base, an A power supply electrical operation mechanism.

The B power supply component includes a signboard of closing and breaking status of the B power supply, a B power supply connecting rod, a B power supply mechanical interlocking mechanism, a B power supply permanent magnet driving mechanism, a B power supply crank arm mechanism, an auxiliary contact device of B power supply solid sealed pole, a B power supply driving connecting rod, a B power supply solid sealed pole, a B power supply closing and locking press arm, a B power supply manual emergency breaking pull rod, a B power supply axial limiting mechanism, a B power supply breaking spring, a B power supply terminal contact arm, a B power supply manual closing reset spring, a B power supply closing hydraulic buffer mechanism, a B power supply crank arm mounting base, a B power supply electrical operation mechanism.

The A power supply solid sealed pole and the B power supply solid sealed pole are connected to the body frame in parallel by screws. The body frame is mounted on a chassis. The A power supply crank arm mounting base and the B power supply crank arm mounting base are both mounted on the body frame. The A power supply crank arm mechanism and the B power supply crank arm mechanism are mounted on the A power supply crank arm mounting base and the B power supply crank arm mounting base respectively. The A power supply permanent magnet driving mechanism and the B power supply permanent magnet driving mechanism are fixed on the corresponding position of the body frame by screws. The A power supply mechanical interlocking mechanism and the B power supply mechanical interlocking mechanism are mounted on the A power supply permanent magnet driving mechanism and the B power supply permanent magnet driving mechanism respectively. A chassis closing and locking mechanism is fixed on the body frame. The A power supply manual emergency breaking pull rod and the B power supply manual emergency breaking pull rod are connected to the A power supply connecting rod and the B power supply connecting rod respectively. The A power supply manual closing reset spring and the B power supply manual closing reset spring are connected to an upper end and a lower end of a manual closing mechanism respectively.

One side of the A power supply crank arm mechanism is connected to the A power supply solid sealed pole and the A power supply breaking spring, and the other side of the A power supply crank arm mechanism is connected to the A power supply permanent magnet driving mechanism. One side of the B power supply crank arm mechanism is connected to the B power supply solid sealed pole and the B power supply breaking spring, the other side of the B power supply crank arm mechanism is connected to the B power supply permanent magnet driving mechanism. The A power supply terminal contact arm is fixed connected to a power interface of the A power supply solid sealed pole. A load terminal contact arm is fixed connected to a load interface of the A power supply solid sealed pole and a load interface of the B power supply solid sealed pole respectively. The B power supply terminal contact arm is fixed connected to a power interface of the B power supply solid sealed pole.

When the power supply is transferred from the A power supply to the B power supply, the coil of the A power supply permanent magnet driving mechanism in a closing state is powered by the charging capacitor, and the moving iron core and the fixed iron core of the A power supply permanent magnet driving mechanism are separated. The A power supply solid sealed pole is driven by the A power supply breaking spring to break a current. The A power supply mechanical interlocking connecting rod is driven to move by the moving iron core of the A power supply permanent magnet driving mechanism. And the auxiliary contact is driven to rotate by the driving connecting rod. The signboard of closing and breaking status of the A power supply is driven to rotate by the A power supply connecting rod, so that a power-off function of the A power supply is completed. After the breaking of the A power supply is completed, the coil of the B power supply permanent magnet in an open state is powered by the charging capacitor. A moving iron core and a fixed iron core of the B power supply permanent magnet are drawn together. The B power supply solid sealed pole in breaking state is closed by the B power supply crank arm mechanism, driven by the B power supply permanent magnet. At the same time, the B power supply breaking spring is compressed to store energy. The B power supply mechanical interlocking mechanism is driven by the moving iron core of the B power supply permanent magnet to move. The auxiliary contact device of the B power supply solid sealed pole is driven by the B power supply driving connecting rod to rotate. The B power supply connecting rod is driven to drive the signboard of closing and breaking status of the B power supply to rotate. The chassis locking crank arm is tightly pressed by the chassis closing and locking mechanism, such that after the closing is completed, the locking function of cranking in or out the chassis is realized.

The medium voltage double power supply change-over switch is provided with the manual emergency breaking mechanism. The handle is inserted into a square hole of the rotating shaft of manual emergency breaking mechanism to rotate, and the moving iron core of the permanent magnet is pulled to separate from the fixed iron core of the permanent magnet by the manual emergency breaking mechanism, so that a movable contact and a fixed contact of the solid sealed pole is separated to complete a function of manual emergency breaking.

The medium voltage double power supply change-over switch is provided with the manual emergency closing mechanism. The handle is inserted into a hole of the rocker arm of the manual emergency closing mechanism, a manual closing of the A power supply or B power supply can be realized by moving the handle upward or downward.

The medium voltage double power supply change-over switch is provided with the in-out auxiliary mechanism of the movable contact. The handle is inserted into the square hole of the rotating shaft of auxiliary mechanism to rotate, and the rocker arms on two sides stretch out and swing in a clockwise or an anti-clockwise direction, to push a switch body inward or outward with the help of the left power supply cabinet auxiliary device and the right power supply cabinet auxiliary device.

The medium voltage double power supply change-over switch is provided with the chassis closing and locking mechanism. When the A or B power supply is closed, A power supply crank arm mechanism or the B power supply crank arm mechanism drives the chassis closing and locking mechanism to tightly press the locking crank arm through the B power supply closing and locking press arm or the pulling rod, so as to tightly lock the chassis. The crank handle is cranked. The chassis screw square shaft and the chassis unlocking plate are located at a lower end of the locking crank arm to crank in or out the chassis.

The medium voltage double power supply change-over switch is provided with the signboard of closing and breaking status of the A power supply and the signboard of closing and breaking status of the B power supply. When the power supply is closing or breaking, the moving iron cores of the A power supply permanent magnet mechanism and the B power supply permanent magnet mechanism drives the A power supply connecting rod and the B power supply connecting rod to move. The signboard of closing and breaking status of the A power supply and the signboard of closing and breaking status of the B power supply are driven to rotate to correctly display the closing and breaking state of the power supply.

The medium voltage double power supply change-over switch is provided with the A power supply crank arm mechanism, the B power supply crank arm mechanism, the A power supply axial limiting mechanism, the B power supply axial limiting mechanism. An axial movement of the A power supply crank arm mechanism and the B power supply crank arm mechanism is limited by the A power supply axial limiting mechanism and the B power supply axial limiting mechanism without affecting the normal rotation of the A power supply crank arm mechanism and the B power supply crank arm mechanism.

The medium voltage double power supply change-over switch is provided with the breaking hydraulic buffer mechanism to absorb the remaining system after breaking, to prevent a rigid collision of the system.

The medium voltage double power supply change-over switch is provided with the A power supply closing hydraulic buffer mechanism and the B power supply closing hydraulic buffer mechanism to absorb the remaining system energy after closing, to prevent a closing bounce of the system.

The medium voltage double power supply change-over switch is provided with the valve actuator. When the switch body is moved, a valve of a power distributor cabinet is open through the valve actuator.

The medium voltage double power supply change-over switch is provided with the A power supply mechanical interlocking mechanism and the B power supply mechanical interlocking mechanism. The A power supply connecting rod is fixed on the A power supply permanent magnet driving mechanism, the B power supply connecting rod is fixed on the B power supply permanent magnet driving mechanism. The A power supply connecting rod and the B power supply connecting rod are buckled with each other to ensure that two power supply systems will not be closed at the same time. Either a state in which one power supply system is closed or a state in which both power supply systems are open occurs. Thus, a real electromechanical interlocking of the medium voltage double power supply change-over switch is achieved.

The medium voltage double power supply change-over switch uses the integrated electromechanical design and is provided with electrical and mechanical double interlocking. The permanent magnet mechanism is used as the main driving force for driving and holding. The invention is provided with a spring as the breaking force and closing buffer and a chassis and a plum blossom contact structure.

A manual emergency breaking and manual closing function are provided. Further, the invention is provided with an in-out auxiliary mechanism of a movable contact, a chassis closing and locking mechanism, and a hydraulic buffer mechanism for closing and breaking. Advantages of the present invention include a simple structure, stable performance, good reliability, and long mechanical life. The pull-out structure is used, greatly improving the convenience of installation and maintenance. The capacitor is used as a permanent magnet drive power supply.

Figure 1:
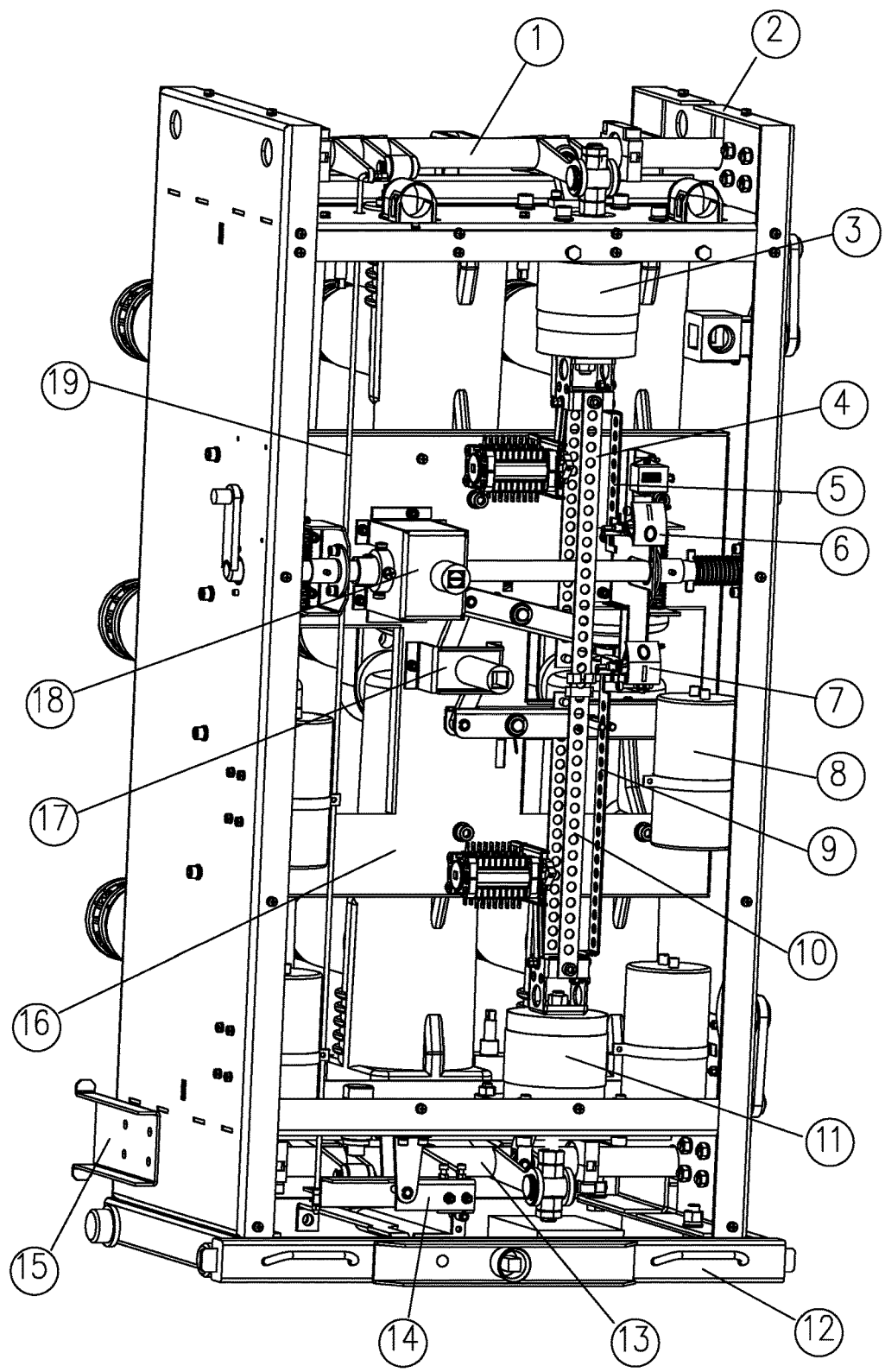
FIG. 1 is the first perspective view of the medium voltage double power supply change-over switch with the permanent magnet of the present invention.
Figure 2:
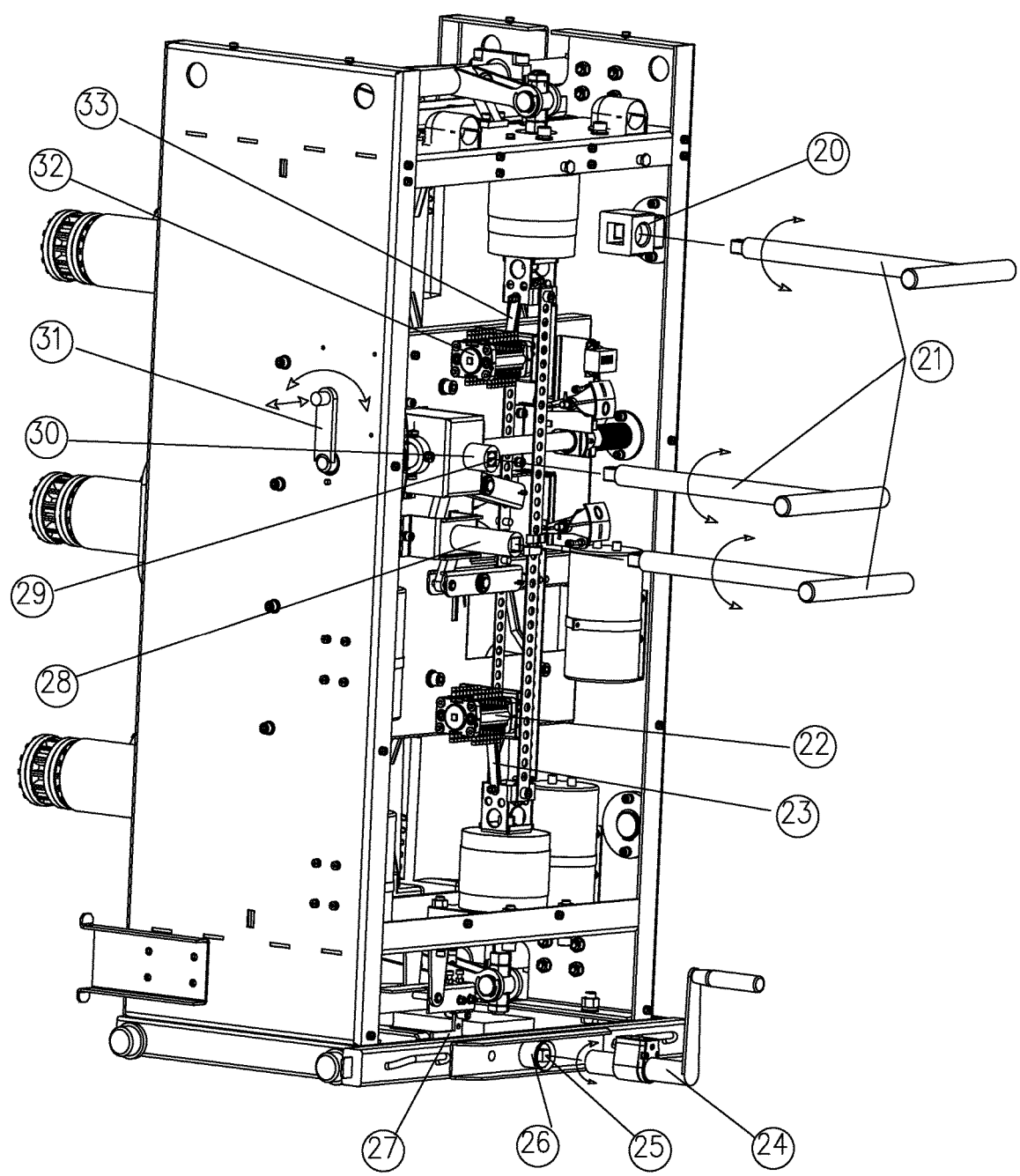
FIG. 2 is the second perspective view of the medium voltage double power supply change-over switch with the permanent magnet of the present invention.

In the drawings: 1 A power supply crank arm mechanism, 2 body frame, 3 A power supply permanent magnet driving mechanism, 4 A power supply mechanical interlocking mechanism, 5 A power supply connecting rod, 6 A signboard of closing and breaking status of the power supply, 7 B signboard of closing and breaking status of the power supply, 8 charging capacitor, 9 B power supply connecting rod, 10 B power supply mechanical interlocking mechanism, 11 B power supply permanent magnet driving mechanism, 12 chassis, 13 B power supply crank arm mechanism, 14 chassis closing and locking mechanism, 15 valve actuator, 16 mounting substrate, 17 manual emergency breaking mechanism, 18 in-out auxiliary mechanism of a movable contact, 19 pulling rod, 20 rocker arm, 21 handle, 22 B auxiliary contact device of power supply solid sealed pole, 23 B power supply driving connecting rod, 24 crank handle, 25 chassis screw rod square shaft, 26 chassis unlocking plate equipped with chassis, 27 locking crank arm, 28 rotating shaft of manual emergency breaking mechanism, 29 square hole, 30 rotating shaft of auxiliary mechanism, 31 rocker arm, 32 A auxiliary contact device of power supply solid sealed pole, 33 A Power supply driving connecting rod, 34 A power supply solid sealed pole, 35 B power supply solid sealed pole, 36 A power supply closing and locking press arm, 37 breaking hydraulic buffer mechanism, 38B power supply closing and locking press arm, 39 A power supply axial limiting mechanism, 40 A power supply manual emergency breaking pull rod, 41 B power supply manual emergency breaking pull rod, 42 B power supply axial limiting mechanism, 43 B power supply breaking spring, 44 B power supply terminal contact arm, 45 load terminal contact arm, 46 power supply terminal contact arm, 47 A power supply breaking spring, 48 A power supply closing hydraulic buffer mechanism, 49 A power supply manual closing reset spring, 50 B power supply manual closing reset spring, 50, 51 B power supply closing hydraulic buffer mechanism, 52 manual closing mechanism, 53 A power supply crank arm mounting base, 54 B power supply crank arm mounting base, 55 A power supply electrical operation mechanism, 56 B power supply electrical operation mechanism, 57 left power supply cabinet auxiliary device, 58 right power supply cabinet auxiliary device.

DETAILED DESCRIPTION OF THE EMBODIMENTS

Hereinafter, the present invention will be further described with reference to the drawings.

As shown in FIGS. 1 to 8, a medium voltage double power supply change-over switch with a permanent magnet mainly includes an A power supply component, a B power supply component, body frame 2, charging capacitor 8, chassis 12, chassis closing and locking mechanism 14, valve actuator 15, mounting substrate 16, manual emergency breaking mechanism 17, in-out auxiliary mechanism of a movable contact 18, pulling rod 19, rocker arm 20, handle 21, crank handle 24, chassis screw rod square shaft 25, chassis unlocking plate equipped with chassis 26, locking crank arm 27, rotating shaft of manual emergency breaking mechanism 28, square hole 29, rotating shaft of auxiliary mechanism 30, rocker arm 31, breaking hydraulic buffer mechanism 37, load terminal contact arm 45, manual emergency closing mechanism 52, left power supply cabinet auxiliary device 57, and left power supply cabinet auxiliary device 58.

The A power supply component includes A power supply crank arm mechanism 1, A power supply permanent magnet driving mechanism 3, A power supply mechanical interlocking mechanism 4, A power supply connecting rod 5, signboard of closing and breaking status of the A power supply 6, auxiliary contact device of A power supply solid sealed pole 32, A power supply driving connecting rod 33, A power supply solid sealed pole 34, A power supply closing and locking press arm 36, A power supply axial limiting mechanism 39, A power supply manual emergency breaking pull rod 40, A power supply terminal contact arm 46, A power supply breaking spring 47, A power supply closing hydraulic buffer mechanism 48, A power supply manual closing reset spring 49, A power supply crank arm mounting base 53, A power supply electrical operation mechanism 55.

The B power supply component includes signboard of closing and breaking status of the B power supply 7, B power supply connecting rod 9, B power supply mechanical interlocking mechanism 10, B power supply permanent magnet driving mechanism 11, B power supply crank arm mechanism 13, auxiliary contact device of B power supply solid sealed pole 22, B power supply driving connecting rod 23, B power supply solid sealed pole 35, B power supply closing and locking press arm 38, B power supply manual emergency breaking pull rod 41, B power supply axial limiting mechanism 42, B power supply breaking spring 43, B power supply terminal contact arm 44, B power supply manual closing reset spring 50, B power supply closing hydraulic buffer mechanism 51, B power supply crank arm mounting base 54, and B power supply electrical operation mechanism 56.

Figure 3:
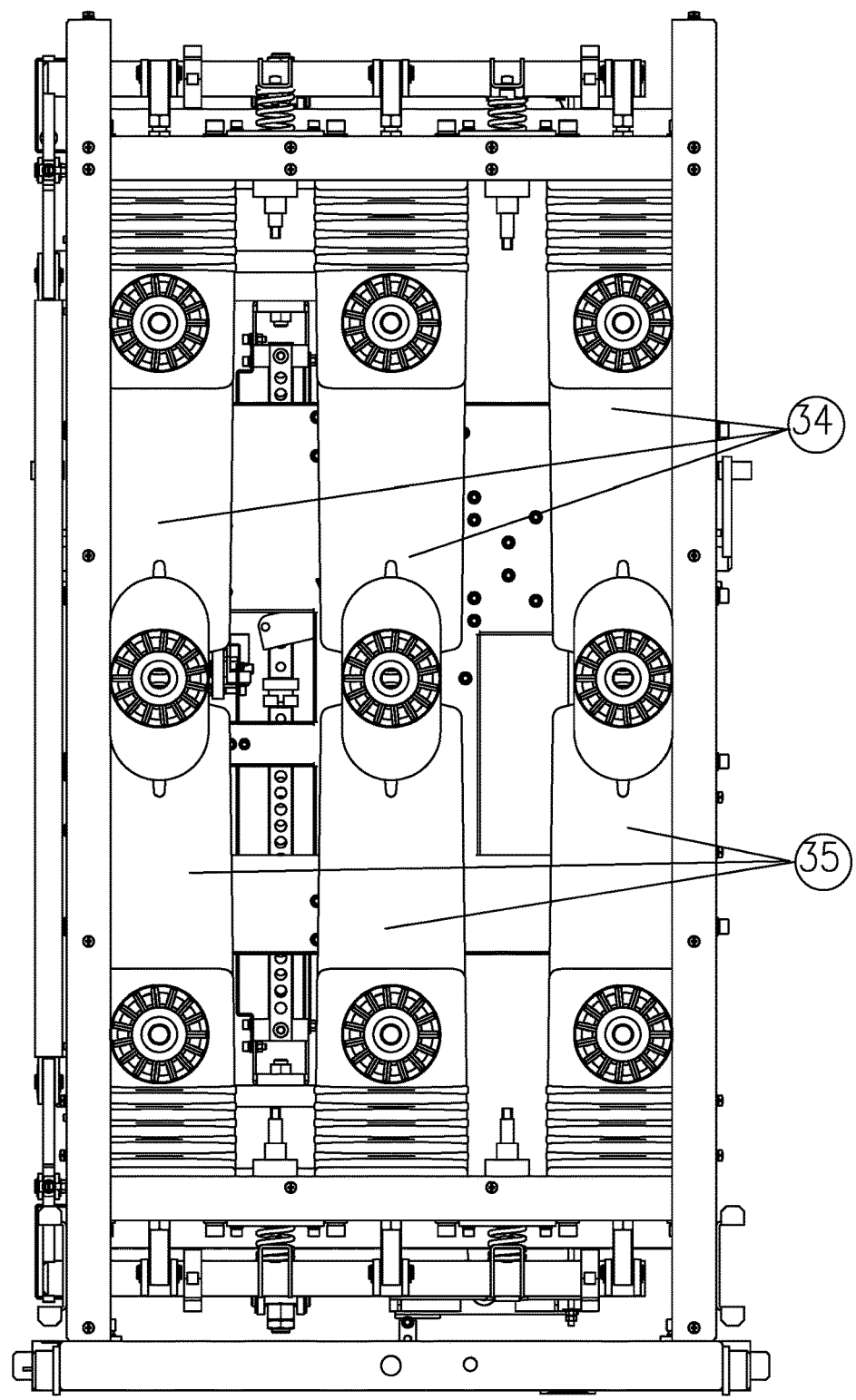
FIG. 3 is the front view of the medium voltage double power supply change-over switch with the permanent magnet of the present invention.
Figure 4:
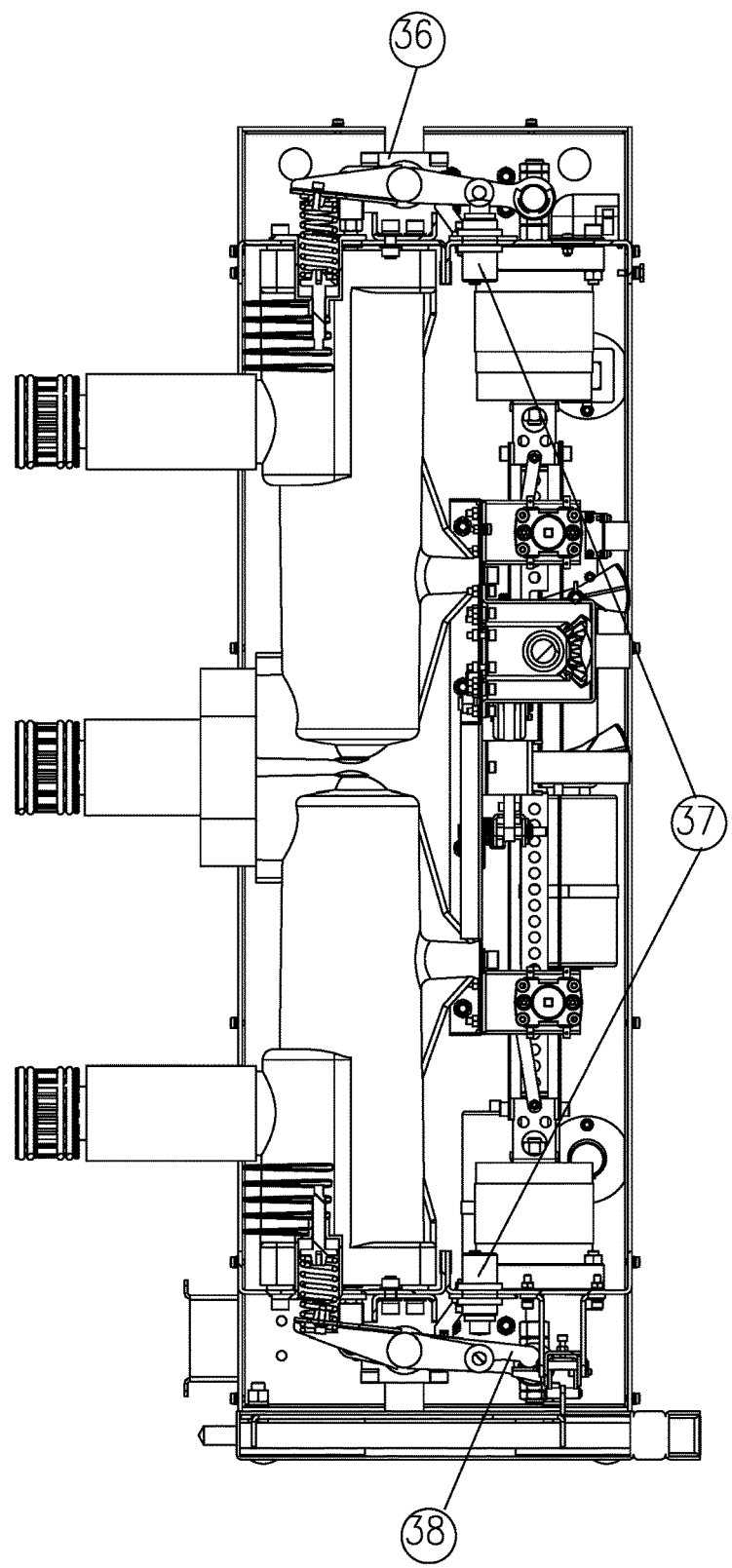
FIG. 4 is the left view of the medium voltage double power supply change-over switch with the permanent magnet of the present invention.
Figure 5:
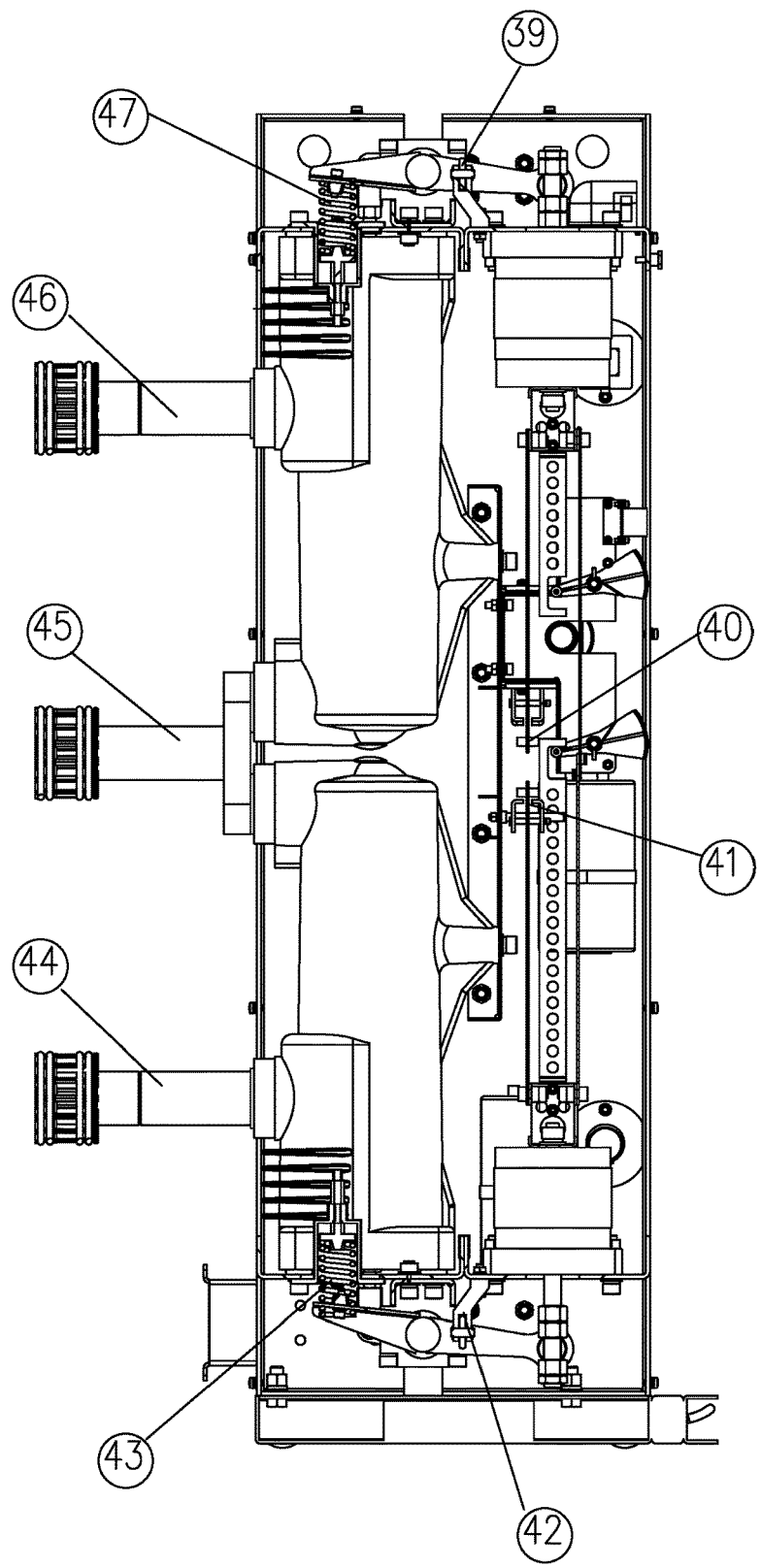
FIG. 5 is the sectional view of the left view of the medium voltage double power supply change-over switch with the permanent magnet of the present invention.
Figure 6:
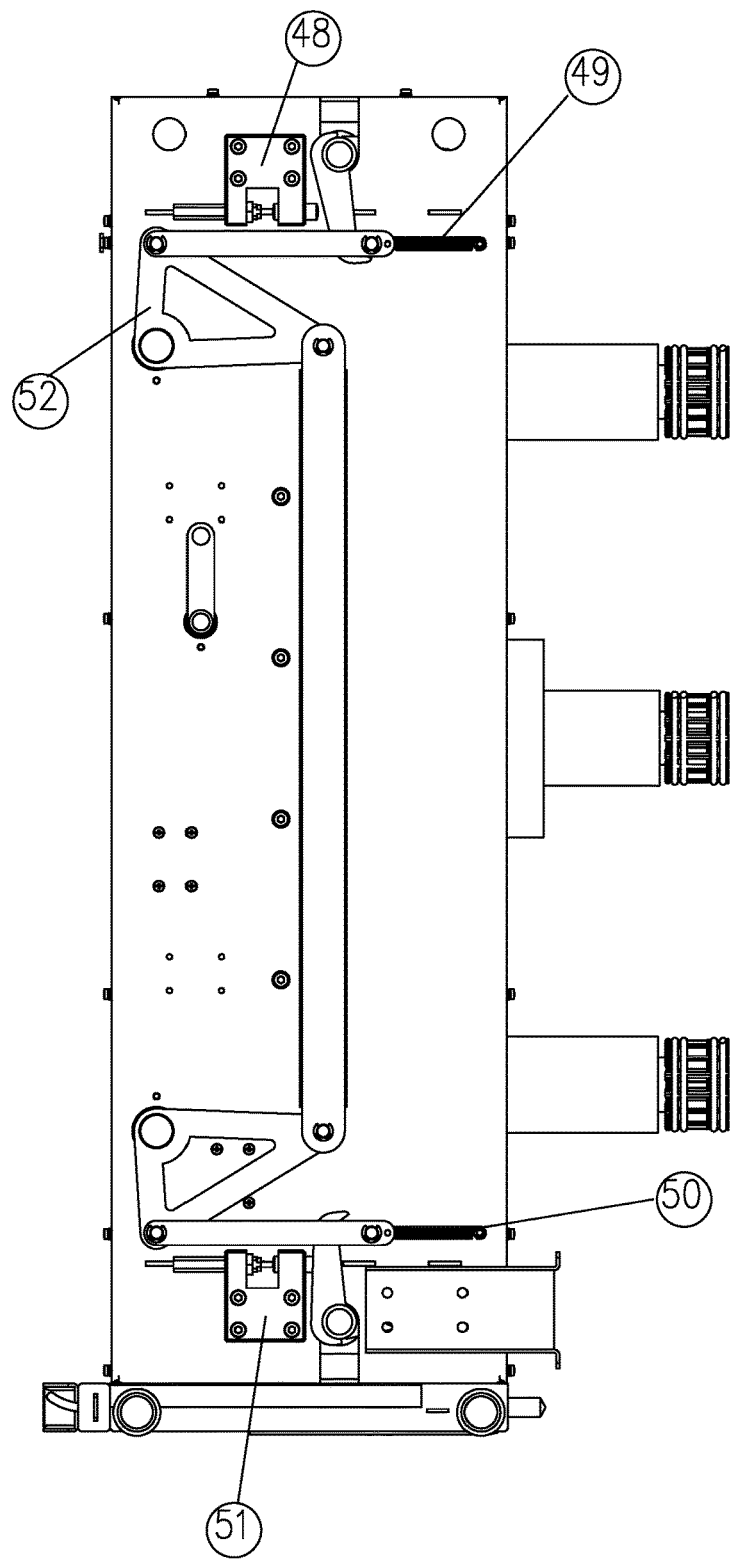
FIG. 6 is the right view of the medium voltage double power supply change-over switch with the permanent magnet of the present invention.
Figure 7:
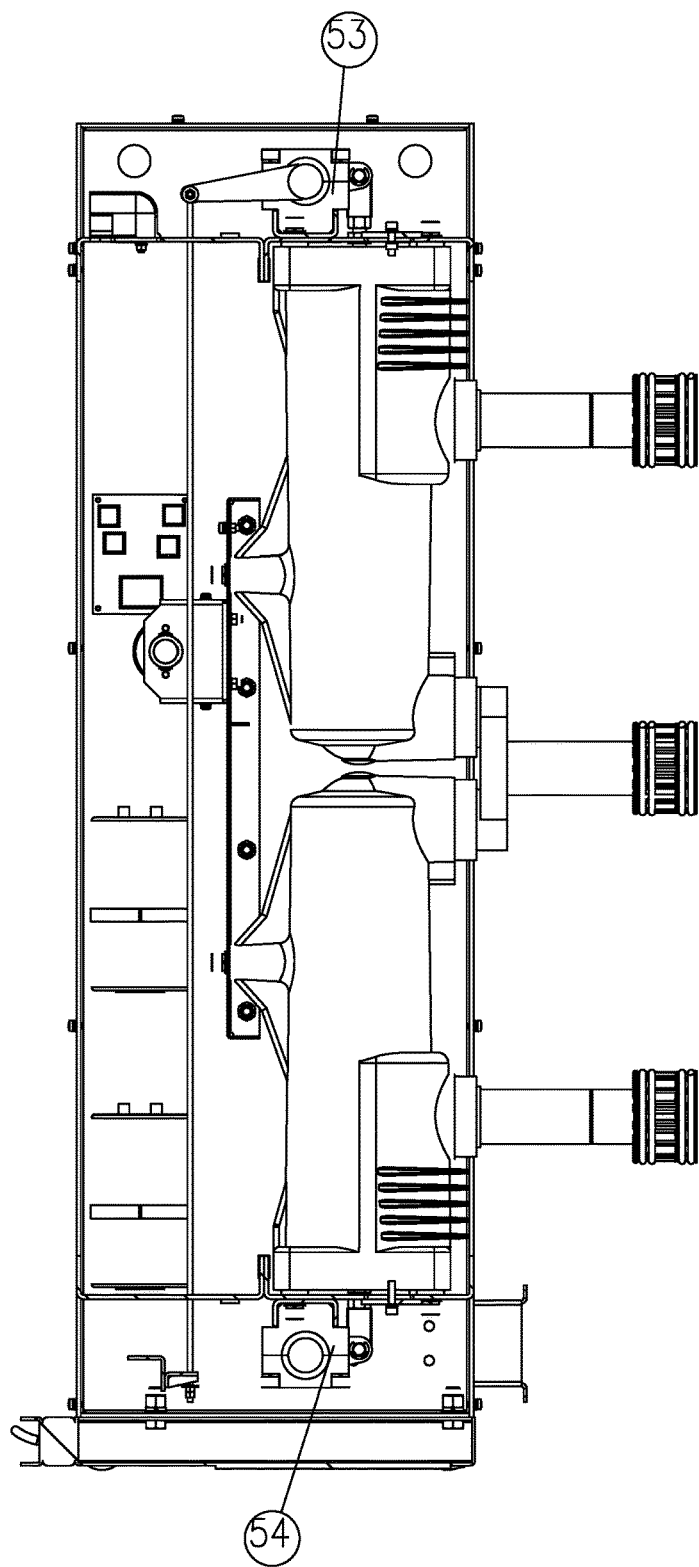
FIG. 7 is the sectional view of the right view of the medium voltage double power supply change-over switch with the permanent magnet of the present invention.
Figure 8:
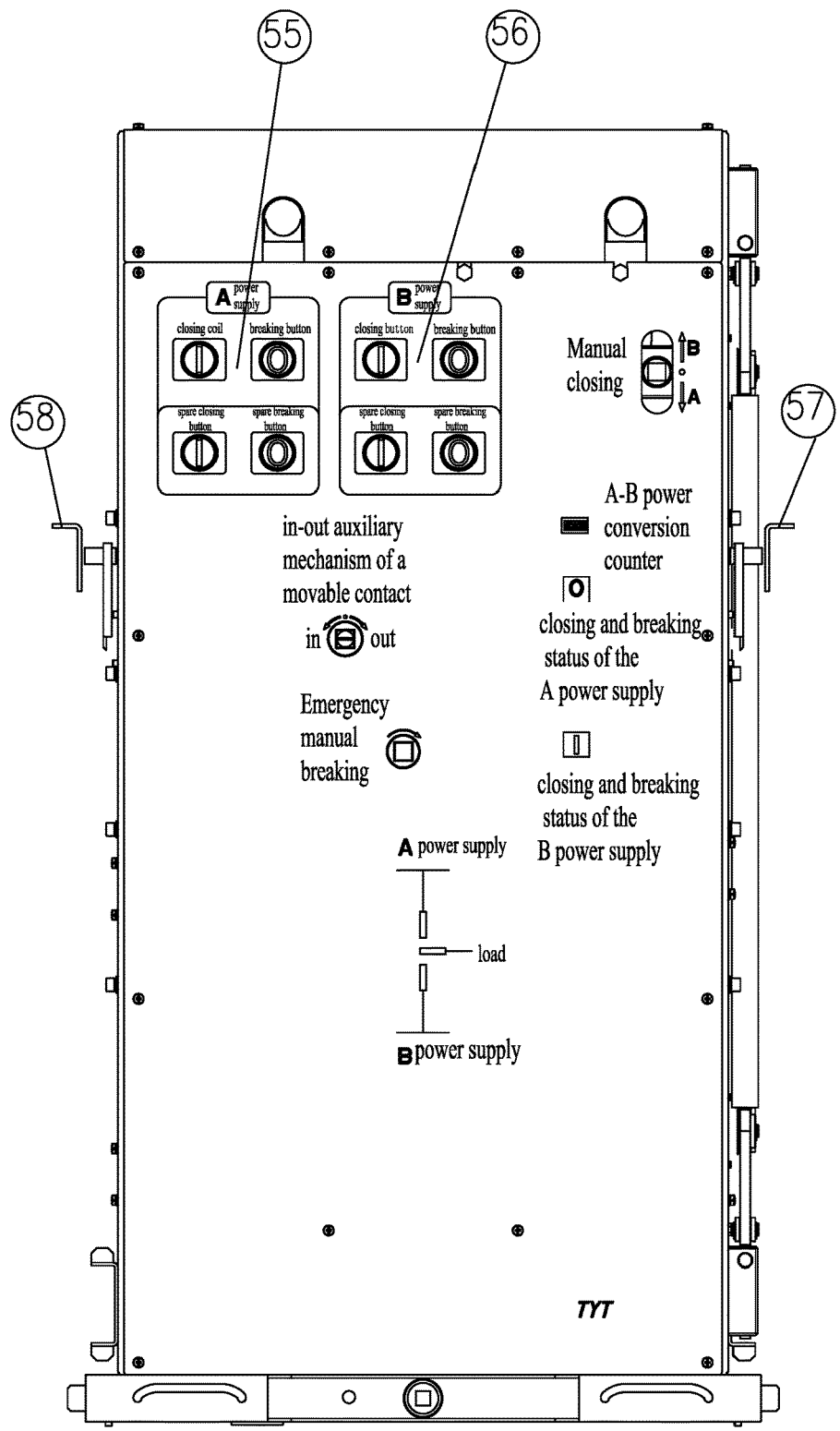
FIG. 8 is the whole rear view of the medium voltage double power supply change-over switch with the permanent magnet of the present invention.

As shown in FIG. 3, A power supply solid sealed pole 34 and B power supply solid sealed pole 35 are connected to body frame 2 in parallel by screws. Body frame 2 is mounted on chassis 12. A power supply crank arm mounting base 53 and B power supply crank arm mounting base 54 are both mounted on body frame 2. A power supply crank arm mechanism 1 and B power supply crank arm mechanism 13 are mounted on A power supply crank arm mounting base 53 and B power supply crank arm mounting base 54 respectively. A power supply permanent magnet driving mechanism 3 and B power supply permanent magnet driving mechanism 11 are fixed on corresponding locations on body frame 2 by screws. A power supply mechanical interlocking mechanism 4 and B power supply mechanical interlocking mechanism 10 are mounted on A power supply permanent magnet driving mechanism 3 and B power supply permanent magnet driving mechanism 11 respectively. Chassis closing and locking mechanism 14 is fixed on body frame 2.

One side of A power supply crank arm mechanism 1 is connected to A power supply solid sealed pole 34 and A power supply breaking spring 47. The other side of A power supply crank arm mechanism 1 is connected to A power supply permanent magnet driving mechanism 3. One side of B power supply crank arm mechanism 13 is connected to B power supply solid sealed pole 35 and B power supply breaking spring 43. The other side of B power supply crank arm mechanism 13 is connected to B power supply permanent magnet driving mechanism 11. Crank handle 24, chassis screw rod square shaft 25, and chassis unlocking plate equipped with chassis 26 are all located at a lower end of locking crank arm 27 so as to crank in or out the chassis. A power supply manual emergency breaking pull rod 40 and B power supply manual emergency breaking pull rod 41 are connected to A power supply connecting rod 5 and B power supply connecting rod 9 respectively. A power supply terminal contact arm 46 is connected to a power interface of A power supply solid sealed pole 34 in a fastening manner. Load terminal contact arm 45 is connected to a load interface of the A power supply solid sealed pole and a load interface of the B power supply solid sealed pole respectively in a fastening manner. B power supply terminal contact arm 44 is connected to a power interface of B power supply solid sealed pole 35 in a fastening manner. A power supply manual closing reset spring 49 and B power supply manual closing reset spring 50 are connected to a upper end and a lower end of manual closing mechanism 52 respectively.

The medium voltage double power supply change-over switch is provided with manual emergency breaking mechanism 17. Handle 21 is inserted into a square hole of rotating shaft of manual emergency breaking mechanism 28 to rotate. Manual emergency breaking mechanism 17 pulls the moving iron core of the permanent magnet to separate from the fixed iron core of the permanent magnet, so that a movable contact and a fixed contact of the solid sealed pole are separated. Thus, the function of manual emergency breaking is completed.

The medium voltage double power supply change-over switch is provided with the manual emergency closing mechanism. Handle 21 is inserted into a hole of rocker arm 20 of manual emergency closing mechanism 52. The handle is moved upward or downward to realize a manual closing of the A power supply or B power supply.

The medium voltage double power supply change-over switch is provided with in-out auxiliary mechanism of the movable contact 18. Handle 21 is inserted into square hole 29 of rotating shaft of in-out auxiliary mechanism of the movable contact 30 to rotate. Rocker arms 31 on both sides stretch out and swing in a clockwise or anti-clockwise direction. With the help of left power supply cabinet auxiliary device 57 and left power supply cabinet auxiliary device 58, a switch body is pushed inward or outward.

The medium voltage double power supply change-over switch is provided with chassis closing and locking mechanism 14. After the A or B power supply is closed, chassis closing and locking mechanism 14 is driven to tightly press chassis locking crank arm 27 by A power supply crank arm mechanism 1 or B power supply crank arm mechanism 13 through B power supply closing and locking press arm 38 or pulling rod 19 to tightly lock the chassis, so that the chassis cannot be cranked in or out.

The medium voltage double power supply change-over switch is provided with signboard of closing and breaking status of the A power supply 6 and signboard of closing and breaking status of the B power supply 7. During the closing or breaking of the power supply, A power supply permanent magnet driving mechanism 3 and B power supply permanent magnet driving mechanism 11 drive the moving iron core. A power supply connecting rod 5 and B power supply connecting rod 9 drive signboard of closing and breaking status of the A power supply 6 and signboard of closing and breaking status of the B power supply 7 to rotate, so as to correctly display the closing and breaking status of the power supply.

The medium voltage double power supply change-over switch is provided with A power supply crank arm mechanism 1, B power supply crank arm mechanism 13, A power supply axial limiting mechanism 39, and B power supply axial limiting mechanism 42. The axial series movement of A power supply crank arm mechanism 1 and B power supply crank arm mechanism 13 is limited by A power supply axial limiting mechanism 39 and B power supply axial limiting mechanism 42. Since the roller mechanism is used, the friction is very small. Thus, the normal rotation of A power supply crank arm mechanism 1 and B power supply crank arm mechanism 13 is not be affected.

The medium voltage double power supply change-over switch is provided with breaking hydraulic buffer mechanism 37 to absorb the remaining system energy after breaking, so as to prevent a rigid collision of the system.

The medium voltage double power supply change-over switch is provided with A power supply closing hydraulic buffer mechanism 48 and B power supply closing hydraulic buffer mechanism 51 to absorb the remaining system energy after closing, so as to prevent a closing bounce of the system.

The medium voltage double power supply change-over switch is provided with valve actuator 15. When the change-over switch body is moved, the valve of the power distributor cabinet is open through valve actuator 15.

One side of A power supply crank arm mechanism 1 and B power supply crank arm mechanism 13 is connected to A power supply solid sealed pole 34, B power supply solid sealed pole 35, B power supply breaking spring 43, A power supply breaking spring 47. The other side of A power supply crank arm mechanism 1 and B power supply crank arm mechanism 13 is connected to A power supply permanent magnet driving mechanism 3 and B power supply permanent magnet driving mechanism 11. When the magnetism of the current flowing through the coil of A power supply permanent magnet driving mechanism 3 and B power supply permanent magnet driving mechanism 11 is in the same direction as the magnetism of the permanent magnet, the moving iron core and the fixed iron core of A power supply permanent magnet driving mechanism 3 or B power supply permanent magnet driving mechanism 11 are drawn together. A power supply solid sealed pole 34 or B power supply solid sealed pole 35 is closed. At the same time, A power supply permanent magnet driving mechanism 3 and B power supply permanent magnet driving mechanism 11 are compressed to store the energy. When the magnetism of the current flowing through the coil of A power supply permanent magnet driving mechanism 3 and B power supply permanent magnet driving mechanism 11 is in the opposite direction with respect to the magnetism of the permanent magnet, the moving iron core and the fixed iron core of A power supply permanent magnet driving mechanism 3 or B power supply permanent magnet driving mechanism 11 are quickly separated from each other by A power supply breaking spring 43 or A power supply breaking spring 47. A power supply solid sealed pole 34 or B power supply solid sealed pole 35 is closed and open.

The medium voltage double power supply change-over switch is provided with A power supply mechanical interlocking mechanism 4 and B power supply mechanical interlocking mechanism 10. A power supply connecting rod 4 is fixed on A power supply permanent magnet driving mechanism 3. B power supply connecting rod 10 is fixed on B power supply permanent magnet driving mechanism 11. A power supply connecting rod 4 and B power supply connecting rod 10 are buckled with each other to ensure that the two power supply systems will not be closed at the same time. Either the state in which one power supply system is closed or the state in which both power supply systems are open can occur. A real electromechanical interlocking of the medium voltage double power supply change-over switch is achieved.

As shown in FIGS. 1 to 8, when the power supply is transferred from the A power supply to the B power supply, charging capacitor 8 charges the coil of A power supply permanent magnet mechanism 3 of the A power supply (in a closed state). The moving iron core and the fixed iron core of A power supply permanent magnet driving mechanism 3 are separated. A power supply breaking spring 47 drives A power supply solid sealed pole 34 to break the current. The moving iron core of A power supply permanent magnet driving mechanism 3 drives A power supply mechanical interlocking connecting rod 4 to move. Auxiliary contact device of the A power supply solid sealed pole 32 is driven by A power supply driving connecting rod 33 to rotate. Signboard of closing and breaking status of the A power supply 6 is driven by connecting rod 5 to rotate. Thus, the power-off function of the A power supply is completed. When the breaking of the A power supply is completed, charging capacitor 8 charges B power supply permanent magnet driving mechanism 11 (in an open state), the moving iron core and the fixed iron core of B power supply permanent magnet driving mechanism 11 are drawn together. Driven by B power supply permanent magnet driving mechanism 11, B power supply crank arm mechanism 13 drives B power supply solid sealed pole 35 which is in the open state to close. At the same time, B power supply breaking spring 43 is compressed to store the energy. The moving iron core of B power supply permanent magnet driving mechanism 11 drives B power supply mechanical interlocking connecting rod 10 to move. The auxiliary contact device of A power supply solid sealed pole 32 is driven to rotate by driving connecting rod 23. Signboard of closing and breaking status of the B power supply 7 is driven to rotate by B power supply connecting rod 9. Chassis locking crank arm 27 is tightly pressed by chassis closing and locking mechanism 14. Thus, after the closing is completed, the function of cranking in and out the chassis is locked. Based on the same principle, the transformation from the B power supply to the A power supply and various functions as described above can be achieved.

What is claimed is:

1. A medium voltage double power supply change-over switch with a permanent magnet, comprising:
   a first power supply component,
   a second power supply component,
   a body frame,
   a charging capacitor,
   a chassis,
   a chassis closing and locking mechanism,
   a valve actuator,
   a mounting substrate,
   a manual emergency breaking mechanism,
   an in-out auxiliary mechanism of a movable contact,
   a pulling rod,
   a rocker arm,
   a handle,
   a crank handle,
   a chassis screw rod square shaft,
   a chassis unlocking plate equipped with chassis,
   a locking crank arm,
   a rotating shaft of manual emergency breaking mechanism,
   a square hole,
   a rotating shaft of auxiliary mechanism,
   a rocker arm,
   a breaking hydraulic buffer mechanism,
   a load terminal contact arm,
   a manual emergency closing mechanism,
   a left power supply cabinet auxiliary device, and
   a right power supply cabinet auxiliary device;
   wherein the first power supply component includes
      a first power supply crank arm mechanism,
      a first power supply permanent magnet driving mechanism,
      a first power supply mechanical interlocking mechanism,
      a first power supply connecting rod,
      a first indicator showing closing and breaking status of the first power supply,
      an auxiliary contact device of the first power supply solid sealed pole,
      a first power supply driving connecting rod,
      a first power supply solid sealed pole,
      a first power supply closing and locking press arm,
      a first power supply axial limiting mechanism,
      a first power supply manual emergency breaking pull rod,
      a first power supply terminal contact arm,
      a first power supply breaking spring,
      a first power supply closing hydraulic buffer mechanism,
      a first power supply manual closing reset spring,
      a first power supply crank arm mounting base, and
      a first power supply electrical operation mechanism;
   wherein the second power supply component includes
      a second indicator showing closing and breaking status of the second power supply,
      a second power supply connecting rod,
      a second power supply mechanical interlocking mechanism,
      a second power supply permanent magnet driving mechanism,
      a second power supply crank arm mechanism, an auxiliary contact device of the second power supply solid sealed pole,
a second power supply driving connecting rod,
a second power supply solid sealed pole,
a second power supply closing and locking press arm,
a second power supply manual emergency breaking pull rod,
a second power supply axial limiting mechanism,
a second power supply breaking spring,
a second power supply terminal contact arm,
a second power supply manual closing reset spring,
a second power supply closing hydraulic buffer mechanism,
a second power supply crank arm mounting base, and
a second power supply electrical operation mechanism;
wherein the first power supply solid sealed pole and the second power supply solid sealed pole are connected to the body frame in parallel by screws;
the body frame is mounted on a chassis;
the first power supply crank arm mounting base and the second power supply crank arm mounting base are both mounted on the body frame;
the first power supply crank arm mechanism and the second power supply crank arm mechanism are mounted on the first power supply crank arm mounting base and the second power supply crank arm mounting base respectively;
the first power supply permanent magnet driving mechanism and the second power supply permanent magnet driving mechanism are fixed on corresponding positions of the body frame by screws;
the first power supply mechanical interlocking mechanism and the second power supply mechanical interlocking mechanism are mounted on the first power supply permanent magnet driving mechanism and the second power supply permanent magnet driving mechanism respectively;
a chassis closing and locking mechanism is fixed on the body frame;
the first power supply manual emergency breaking pull rod and the second power supply manual emergency breaking pull rod are connected to the first power supply connecting rod and the second power supply connecting rod respectively;
the first power supply manual closing reset spring and the second power supply manual closing reset spring are connected to an upper end and a lower end of a manual closing mechanism respectively;
one side of the first power supply crank arm mechanism is connected to the first power supply solid sealed pole and the first power supply breaking spring;
an other side of the first power supply crank arm mechanism is connected to the first power supply permanent magnet driving mechanism;
one side of the second power supply crank arm mechanism is connected to the second power supply solid sealed pole and the second power supply breaking spring;
an other side of the second power supply crank arm mechanism is connected to the second power supply permanent magnet driving mechanism;
the first power supply terminal contact arm is fixedly connected to a power interface of the first power supply solid sealed pole;
a load terminal contact arm is fixedly connected to a load interface of the first power supply solid sealed pole and a load interface of the second power supply solid sealed pole respectively;
the second power supply terminal contact arm is fixedly connected to a power interface of the second power supply solid sealed pole;
when the power supply is transferred from the first power supply to the second power supply, the coil of the first power supply permanent magnet driving mechanism in a closed state is powered by the charging capacitor; a moving iron core and a fixed iron core of the first power supply permanent magnet driving mechanism are separated; the first power supply solid sealed pole is driven by the first power supply breaking spring to break a current; the moving iron core of the first power supply permanent magnet driving mechanism drives the first power supply mechanical interlocking mechanism to move; the auxiliary contact device of the first power supply solid sealed pole is driven by the first power supply driving connecting rod to rotate; at the same time, the first indicator showing closing and breaking status of the first power supply driven by the first power supply connecting rod to rotate, so that a power-off function of the first power supply is completed;
after the breaking of the first power supply is completed, the coil of the second power supply permanent magnet in an open state is powered by the charging capacitor; a moving iron core and a fixed iron core of the second power supply permanent magnet are drawn together; the second power supply solid sealed pole in an open state is closed by the second power supply crank arm mechanism configured to be driven by the second power supply permanent magnet; at the same time, the second power supply breaking spring is compressed to store energy; the second power supply mechanical interlocking mechanism is driven by the moving iron core of the second power supply permanent magnet to move; the auxiliary contact device of the second power supply solid sealed pole is driven by the second power supply driving connecting rod to rotate; at the same time, the second power supply connecting rod is driven to drive the second indicator showing closing and breaking status of the second power supply to rotate; the chassis locking crank arm is tightly pressed by the chassis closing and locking mechanism, such that after the closing is completed the function of cranking in or out the chassis is locked.

2. The medium voltage double power supply change-over switch with a permanent magnet according to claim 1, wherein
the medium voltage double power supply change-over switch is provided with the manual emergency breaking mechanism;
when the handle is inserted into a square hole of the rotating shaft of manual emergency breaking mechanism to rotate, the manual emergency breaking mechanism drives the moving iron core of the permanent magnet to separate from the fixed iron core of the permanent magnet by, so that a movable contact and a fixed contact of the solid sealed pole are driven to be separated to complete a function of manual emergency breaking.

3. The medium voltage double power supply change-over switch with a permanent magnet according to claim 1, wherein the medium voltage double power supply change-over switch is provided with the manual emergency closing mechanism;

when the handle is inserted into a hole of the rocker arm of the manual emergency closing mechanism, a manual closing of the first power supply or the second power supply can be realized by moving the handle upward or downward.

4. The medium voltage double power supply change-over switch with a permanent magnet according to claim 1, wherein the medium voltage double power supply change-over switch is provided with the in-out auxiliary mechanism of the movable contact;

when the handle is inserted into the square hole of the rotating shaft of auxiliary mechanism to rotate, two rocker arms stretch out and swing in a clockwise or an anti-clockwise direction, to push a switch body inward or outward with the help of the left power supply cabinet auxiliary device and the right power supply cabinet auxiliary device.

5. The medium voltage double power supply change-over switch with a permanent magnet according to claim 1, wherein the medium voltage double power supply change-over switch is provided with the chassis closing and locking mechanism;

when the first power supply or the second power supply is closed, the first power supply crank arm mechanism or the second power supply crank arm mechanism drives the chassis closing and locking mechanism to tightly press the locking crank arm through the second power supply closing and locking press arm or the pulling rod, so as to tightly lock the chassis; when the crank handle is cranked, the chassis screw rod square shaft and the chassis unlocking plate are located at a lower end of the locking crank arm to crank in or out the chassis.

6. The medium voltage double power supply change-over switch with a permanent magnet according to claim 1, wherein the medium voltage double power supply change-over switch is provided with the first indicator showing closing and breaking status of the first power supply and the second indicator showing closing and breaking status of the second power supply;

when the power supply is closing or breaking, the moving iron core of the first power supply permanent magnet driving mechanism and the second power supply permanent magnet driving mechanism drives the first power supply connecting rod and the second power supply connecting rod to move; and the first indicator showing closing and breaking status of the first power supply and the second indicator showing closing and breaking status of the second power supply are driven to rotate to correctly display the closing and breaking status of the power supply.

7. The medium voltage double power supply change-over switch with a permanent magnet according to claim 1, wherein the medium voltage double power supply change-over switch is provided with the first power supply crank arm mechanism, the second power supply crank arm mechanism, the first power supply axial limiting mechanism, the second power supply axial limiting mechanism;

an axial movement of the first power supply crank arm mechanism and the second power supply crank arm mechanism is limited by the first power supply axial limiting mechanism and the B power supply axial limiting mechanism without affecting normal rotation of the A power supply crank arm mechanism and the B power supply crank arm mechanism.

8. The medium voltage double power supply change-over switch with a permanent magnet according to claim 1, wherein the medium voltage double power supply change-over switch is provided with the breaking hydraulic buffer mechanism to absorb remaining system energy after breaking, to prevent a rigid collision of the system.

9. The medium voltage double power supply change-over switch with a permanent magnet according to claim 1, wherein the medium voltage double power supply change-over switch is provided with the first power supply closing hydraulic buffer mechanism and the second power supply closing hydraulic buffer mechanism to absorb the remaining system energy after closing, so as to prevent a closing bounce of the system.

10. The medium voltage double power supply change-over switch with a permanent magnet according to claim 1, wherein the medium voltage double power supply change-over switch is provided with the valve actuator;

when the switch body is moved, a valve of a power distributor cabinet is open through the valve actuator.

11. The medium voltage double power supply change-over switch with a permanent magnet according to claim 1, wherein the medium voltage double power supply change-over switch is provided with the first power supply mechanical interlocking mechanism and the second power supply mechanical interlocking mechanism;

the first power supply connecting rod is fixed on the first power supply permanent magnet driving mechanism;

the second power supply connecting rod is fixed on the second power supply permanent magnet driving mechanism;

the first power supply connecting rod and the second power supply connecting rod are buckled with each other to ensure that two power supply systems are not be closed at the same time;

either a state in which one power supply system is closed or a state in which both power supply systems are open occurs; and a real electromechanical interlocking of the medium voltage double power supply change-over switch is achieved.

* * * * *